(12) United States Patent
Reed

(10) Patent No.: US 6,889,201 B1
(45) Date of Patent: May 3, 2005

(54) METHOD AND SYSTEM FOR PLASTIC AND WIRE MESH ON-LINE SELECTION

(75) Inventor: George Reed, Berkeley, CA (US)

(73) Assignee: TWP, Inc., Berkeley, CA (US)

( * ) Notice: Subject to any disclaimer, the term of this patent is extended or adjusted under 35 U.S.C. 154(b) by 474 days.

(21) Appl. No.: 09/614,857

(22) Filed: Jul. 12, 2000

(51) Int. Cl.[7] .............................................. G06F 17/60
(52) U.S. Cl. ........................................................ 705/26
(58) Field of Search ..................................... 705/26, 27

(56) References Cited

U.S. PATENT DOCUMENTS

| | | | |
|---|---|---|---|
| 4,007,362 A | | 2/1977 | Sindermann ................. 235/151 |
| 4,598,376 A | | 7/1986 | Burton et al. ................ 364/470 |
| 4,964,043 A | | 10/1990 | Galvin ......................... 364/401 |
| 5,101,352 A | * | 3/1992 | Rembert ...................... 364/401 |
| 5,109,337 A | | 4/1992 | Ferriter et al. ............... 364/401 |
| 5,117,354 A | | 5/1992 | Long et al. .................. 364/401 |
| 5,189,606 A | | 2/1993 | Burns et al. ................. 364/401 |
| 5,249,120 A | | 9/1993 | Foley .......................... 364/401 |
| 5,260,866 A | * | 11/1993 | Lisinski et al. ............. 364/401 |
| 5,357,439 A | | 10/1994 | Matsuzaki et al. .......... 364/468 |
| 5,570,291 A | | 10/1996 | Dudle et al. ........... 364/468.01 |
| 5,600,831 A | | 2/1997 | Levy et al. .................. 395/602 |
| 5,615,342 A | * | 3/1997 | Johnson ...................... 395/227 |
| 5,768,578 A | | 6/1998 | Kirk et al. ................... 395/611 |
| 5,793,632 A | | 8/1998 | Fad et al. .................. 364/464.1 |
| 5,842,201 A | | 11/1998 | Wallack .......................... 707/3 |
| 5,870,717 A | | 2/1999 | Wiecha ........................ 705/26 |
| 5,870,719 A | | 2/1999 | Maritzen et al. .............. 705/26 |
| 5,930,768 A | | 7/1999 | Hooban ........................ 705/27 |
| 5,950,206 A | | 9/1999 | Krause ........................ 707/104 |
| 5,974,396 A | | 10/1999 | Anderson et al. ............. 705/10 |
| 5,974,418 A | * | 10/1999 | Blinn et al. ................. 707/100 |
| 6,552,739 B1 | * | 4/2003 | Reed ........................... 345/854 |
| 2003/0172350 A1 | * | 9/2003 | Reed .......................... 715/513 |
| 2003/0197724 A1 | * | 10/2003 | Reed .......................... 345/738 |

FOREIGN PATENT DOCUMENTS

JP          410280221 A * 10/1998 ............ A41H/3/00

OTHER PUBLICATIONS www.wovenwire.com [archived at www.archive.org prior to Jul. 12, 1999].*

* cited by examiner

Primary Examiner—Jeffrey A. Smith
(74) Attorney, Agent, or Firm—Michael A. Glenn; Glenn Patent Group

(57) ABSTRACT

An Internet wire-mesh disc merchandising system embodiment of the present invention comprises a webserver that generates a web presence. Potential customers looking to select and buy wire mesh are allowed to log-on to a website operated by a wire-mesh retailer, distributor, and manufacturer. An HTML product page includes navigation buttons that link to other HTML product pages. Each page further includes JPG or GIF type pictures that allow the shopper to see a particular wire-mesh disc product corresponding to a presently displayed HTML product page. A set of navigation buttons permit the shopper to hyperlink to HTML product pages where a graphic is presented that corresponds to the selected wire-mesh disc and prices.

16 Claims, 10 Drawing Sheets

METHOD AND SYSTEM FOR PLASTIC AND WIRE MESH ON-LINE SELECTION

BACKGROUND OF THE INVENTION

1. Technical Field

The present invention relates to Internet websites, and more specifically to web pages organized in such a way that a user can browse through available types of disc wire mesh products of a particular supplier and purchase it.

2. Description of the Prior Art

Wire mesh and wire cloth come in many different combinations of weave, material, mesh sizes, wire diameters, and welding. Discs are die-cut from rolls of wire mesh and wire cloth, and are used in many filter applications. Although hundreds or thousands of different combinations of wire type, sizes, weaves, etc., are possible, it may not be practical for a particular supplier to offer all the combinations. Particular combinations of weave, material, mesh sizes, wire diameters, and welding may not manufacturable, e.g., a wire diameter that is so large the mesh openings are closed up or exceeded.

Buyers can often make ordering mistakes in selecting a wire mesh or wire cloth discs because the impossible or unavailable combinations are sometimes too subtle to understand. Ordering the wrong thing can be frustrating for all those involved. The Internet now makes it possible for users to log onto a business' website to select and order products.

Suppliers like TWP, Inc. (Berkeley, Calif.) offer at least three families of mesh materials, e.g., woven wire mesh, welded stainless steel mesh, and galvanized hardware cloth. The woven wire mesh includes a range of traditional to ultra-fine, high-tech alloy, screen materials. The welded stainless steel mesh is a strong, precise material with an accurate grid pattern and relatively large holes. The galvanized hardware cloth includes a range of steel mesh protected by a heavy-duty zinc coating, e.g., for use in outdoor and industrial environments. Such materials are conventionally stocked in 36-inch and 48-inch wide rolls in 100-foot lengths. But rolls up to 300-inches wide can be bought on special order.

Wire cloth is the proper name for what is commonly called screen or mesh. Such material is known for its high strength, wear resistance, ability to withstand high temperatures, and long service life. Wire cloth is woven like textile cloth. So-called market grade wire cloth are woven wire meshes suitable for general purpose work.

Materials that can be used include stainless steel type 304, brass, copper. A line of special woven meshes are available in stainless steel type 316, aluminum, bronze, inconel, nickel, steel and epoxy-coated steel. The user's choice of metal is determined by the product-operation environment and constraining cost considerations.

The wire-mesh hole size, e.g., the distance between two adjacent parallel wires, is a function of both the mesh count and wire diameter. Changing either will change the opening size. The usual opening sizes vary from one-inch openings down to microscopic. The choice of a wire-mesh opening size is determined by the desired sizes of objects to be retained or allowed to pass through. The mesh is the number of openings in a linear inch, measured from the center of one wire to a point one-inch distant.

Two weaves are conventionally available, plain and twilled. The plain weave has an over-one/under-one weave. Such type of wire cloth has square or rectangular openings, and is the simplest and most common weave used in screening and separating applications. The twilled weave is woven with an over-two/under-two weave with wedge-shaped openings. Such weave is generally considered stronger than plain weave and is often used in filtration.

The typical welded stainless steel wire mesh is formed of wires that are fused together at their junctions into a grid. Automatic welding looms are used that accurately position all the shorter (weft) wires over the longer (warp) wires and spot-weld the intersections. These special looms can produce strong, consistent welds without any burning or discoloration.

The standard welded-stainless-steel-wire-mesh material is type 304 stainless steel because of its high corrosion resistance and strength at elevated temperatures. Type 304 stainless steel is also referred to as "18-8", meaning eighteen percent chromium (18% Cr) and eight percent nickel (8% Ni). TWP, Inc. also provides stainless steel types 304L, 316, 316L and other stainless alloys on request.

Standard welded wire mesh openings are always square or rectangular, and range from 0.218 inch to 0.979 inch. Meshes from 4-mesh to 1-mesh are usually stocked, and much larger meshes with up to 10-inch openings and 0.393 inch wire diameter can be obtained on special order.

Galvanized hardware cloth is typically used in partitions, grills, vents, cages and guards, wherever economical, sturdy, corrosion-resistant material is required. Galvanized hardware cloth is a lightweight, economical steel mesh that is protected from atmospheric corrosion by the application of a heavy duty zinc coating, e.g., hot-dip galvanizing. The zinc coating encapsulates the mesh for excellent corrosion protection and a firm, non-raveling product.

The hardware cloth openings are relatively large compared to those of woven mesh, e.g., they range from 0.108 inch to 0.459 inch. The galvanizing process slightly decreases the opening size by about 0.004–0.006 inches. Several special hardware cloth specifications called vent meshes offer larger open areas for increased air flow rates. Readily available galvanized hardware cloth is stocked in 2-mesh, 4-mesh, and 8-mesh. Other special meshes are manufactured as required. The 2-mesh and 4-mesh is available woven or welded and the 8-mesh hardware cloth is woven.

The specifying the quoting wire and plastic mesh discs can involve two-hundred different types of meshes each in five basic materials, and a practically infinite number of sizes. TWP, Inc., for example, offers over four-thousand sizes. If five different quantity-price breaks are appropriate, this still results in twenty-million price offerings. If the customer is allowed a choice of high precision or standard discs, the customer-selection possibilities expand to forty-million. The quoting process further depends on using a commodity woven mesh price standard that fluctuates.

What is needed is an on-line system and method that allows the wire-mesh disc customer to see, select, design, and buy appropriate filter discs, and thereby avoid the conventional request-answer-order cycles that can take days and weeks to complete.

SUMMARY OF THE INVENTION

An Internet wire-mesh disc merchandizing system embodiment of the present invention comprises a webserver that generates a web presence. Potential customers looking to select and buy wire mesh are allowed to log-on to a website operated by a wire-mesh retailer, distributor, and manufacturer. An HTML product page includes navigation buttons that link to other HTML product pages. Each page further includes JPG or GIF type pictures that allow the shopper to see a particular wire-mesh disc product corresponding to a presently displayed HTML product page. A set of navigation buttons permit the shopper to hyperlink to HTML product pages where a graphic is presented that corresponds to the selected wire-mesh disc and prices.

DETAILED DESCRIPTION OF THE INVENTION

Figure 1:
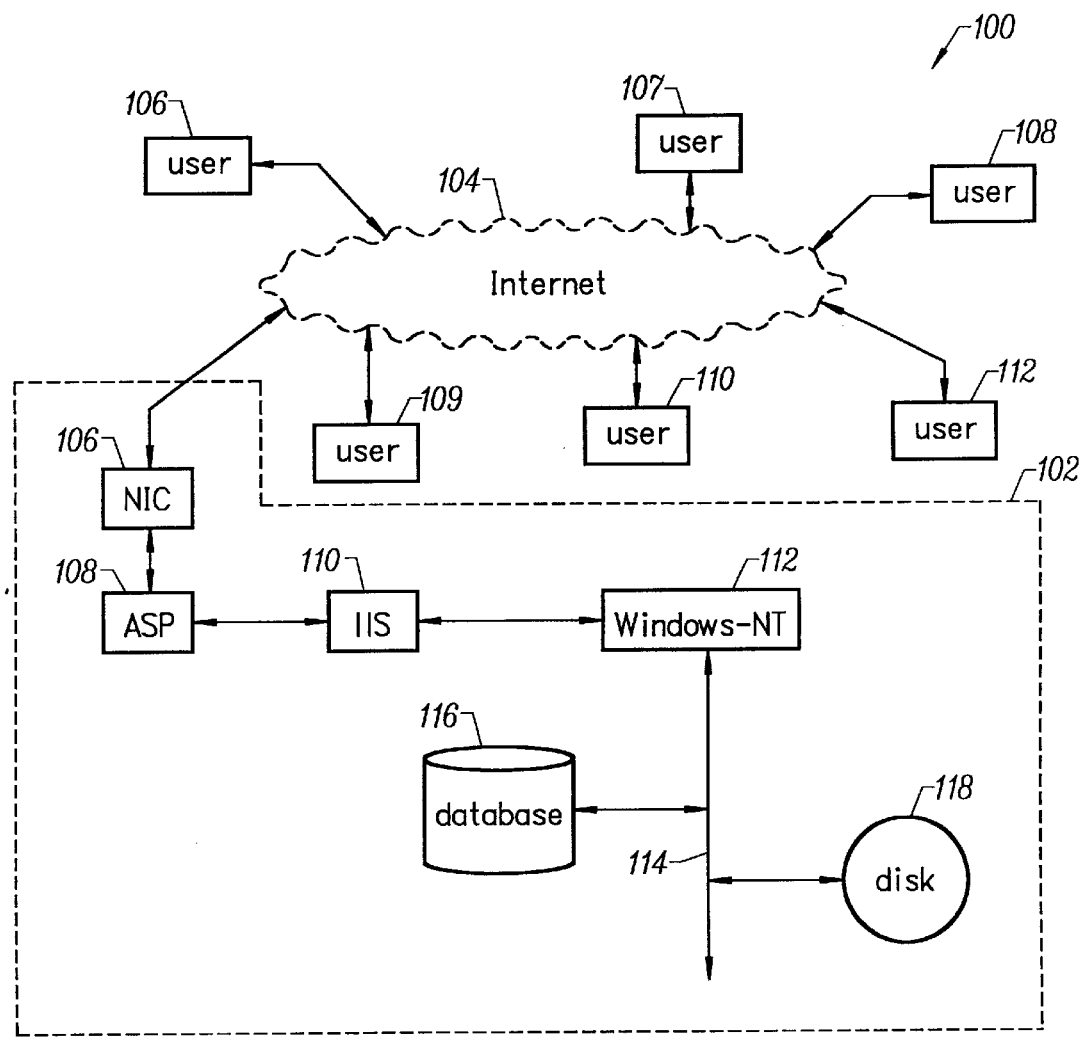
FIG. 1 is a functional block diagram of an Internet wire-mesh disc merchandizing system embodiment of the present invention.

FIG. 1 illustrates an Internet wire-mesh disc merchandizing system embodiment of the present invention, referred to herein by the reference numeral 100. The system 100 comprises a webserver 102 connected to the Internet 104 and many clients or shoppers 106–112. The webserver 102 interfaces to the Internet 104 with a network interface controller (NIC) 106. An interactive webpage user interface 108 provides functionality similar to Microsoft Corporation (Redmond, Wash.) Active Server Pages (ASP). An Internet file and application server 110, such as Microsoft Internet Information Server (IIS), runs under control of an operating system 112, e.g., Microsoft Windows-NT server. The ASP 108 and IIS 110 together generate a web presence on the Internet. An expansion bus 114 supports a database 116 and a general purpose storage disk 118. Various Microsoft Windows-NT services can run without requiring a user to be logged on to the system, e.g., Microsoft SQL Server, Microsoft Exchange Server, Dynamic Host Interface Protocol (DHCP), and even Windows Internet Name Service (WINS) servers. These are preferably stored in disk 118.

Figure 2:
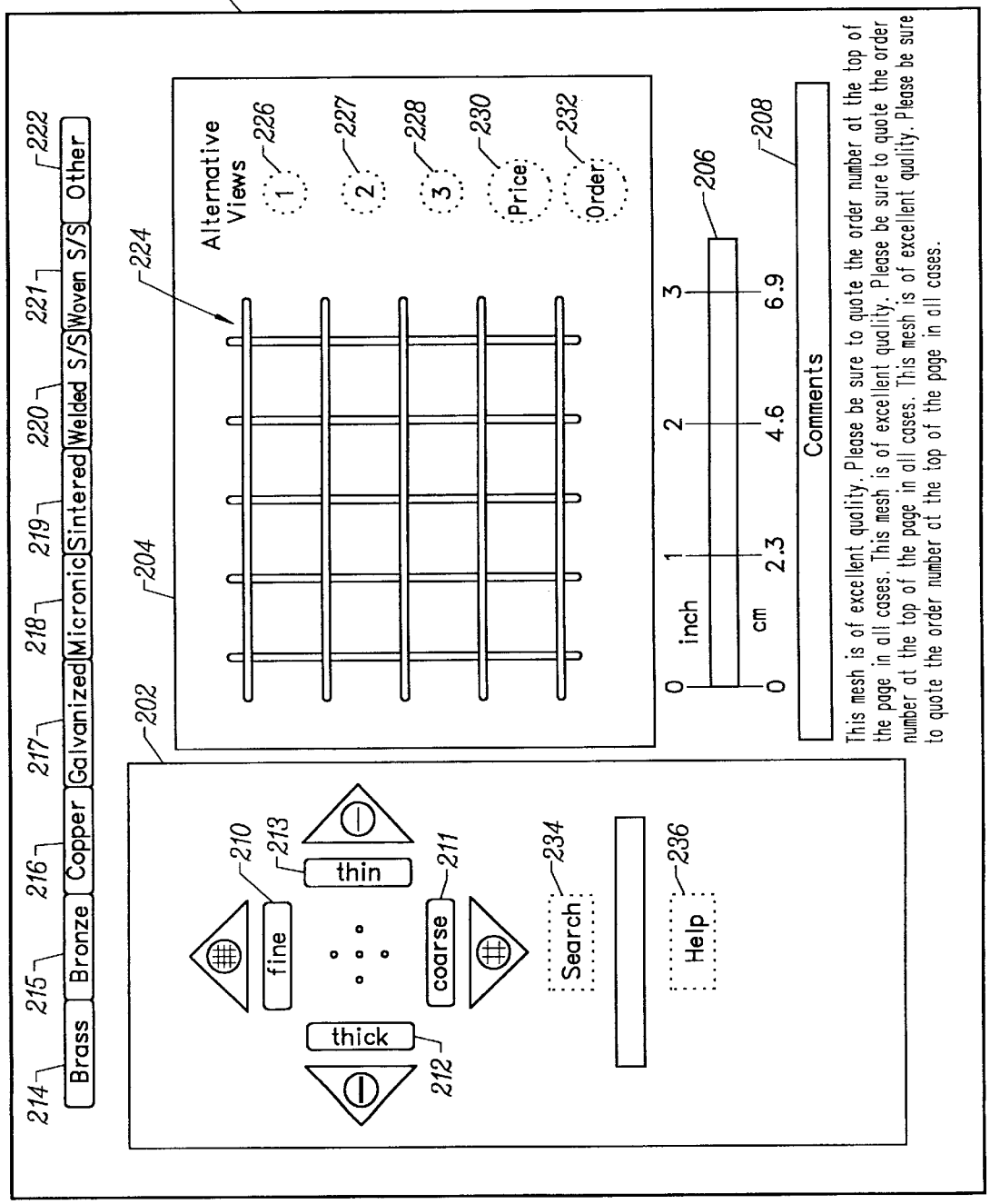
FIG. 2 is a diagram of a graphical user interface for an HTML product page as it presents on a web browser operated by a user at a network client site.

FIG. 2 represents a graphical user interface (GUI) 200 that is presented to an Internet user on a web browser, e.g., Netscape Communicator and Microsoft Internet Explorer. Such GUI is generated by the ASP 108 and IIS 110 (FIG. 1) when the user logs on to the uniform resource locator (URL) address of the website operator. The GUI 200 includes a navigation window 202, a sample-picture window 204, a ruler 206 for scale, and a comments field 208. The navigation window 202 permits the user to navigate through wire-mesh product samples that have finer mesh, coarser mesh, thicker wires, and thinner wires, e.g., by clicking on a set of hyperlink buttons 210–213, respectively. The materials used in the wire-mesh product pictured in window 204 can be selected by clicking on any of several buttons 214–222, e.g., Brass, Bronze, Copper, Galvanized, Micronic, Sintered, Welded Stainless Steel (S/S), Woven Stainless Steel, and Other. It may occur that meshes and wire sizes available in one material may not be available in another material. Amplifying remarks about the wire-mesh product currently selected are provided in the comments field 208.

The website design is such that the discrete products the user can view are those that the seller operating webserver 102 is offering for sale, or at least are those that the seller can actually produce and deliver.

The ruler 206 is a scale provided for the user to understand a picture 224 of a wire-mesh product being presented in window 204. Alternative views of the product, if available, can be accessed by clicking on a set of alternative view buttons 226–228. Such alternate views are presented instead of an initial sample product in picture 224. If the user is curious about the price of the product currently displayed in picture 224, a price button 230 is used to go to a webpage with current pricing. An order button 232 can be clicked-on to take the user to a product ordering webpage. A search button 234 and a help button 236 are provided for navigation help.

Figure 3:
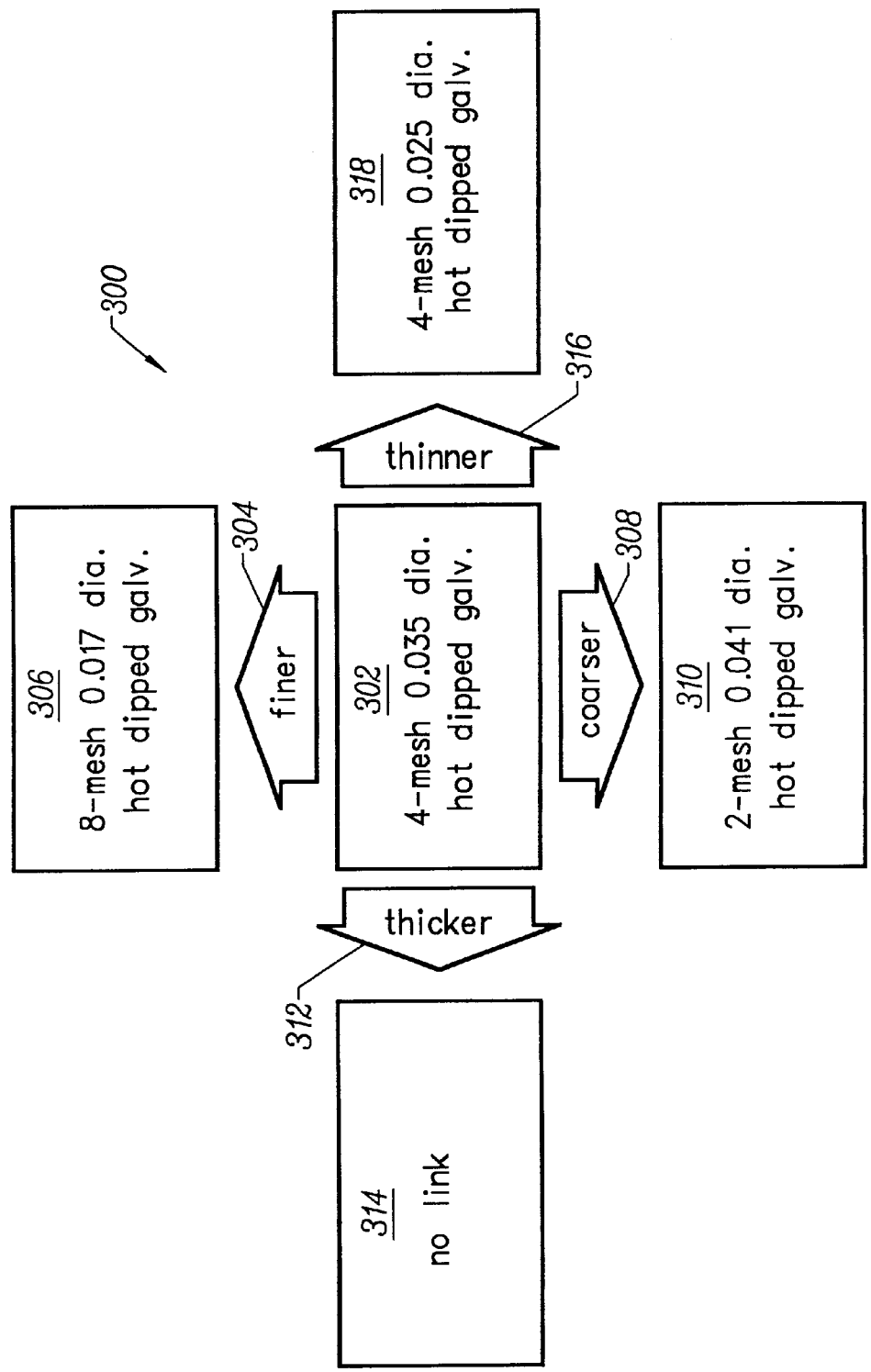
FIG. 3 is a flow diagram that represents the navigation that occurs between HTML product pages as a result of a user clicking on any of four hyperlink buttons for finer, coarser, thicker, and thinner.

A dataflow 300 in FIG. 3 represents the effects of the finer-mesh, coarser-mesh, thicker-wires, and thinner-wires hyperlink buttons 210–213 (FIG. 2). For example, a starting position 302 is for a hot-dipped galvanized 4x4 mesh with 0.035" diameter wire. A finer navigation-direction 304 takes the user to a hot-dipped galvanized 8-mesh with 0.017" diameter wire in a position 306. Such represents the only choice for finer mesh from the starting position 302, a thinner wire is necessitated by requesting a finer (higher count) mesh. A coarser navigation-direction 308 takes the user to a hot-dipped galvanized 2-mesh with 0.041" diameter wire in a position 310. Such represents the only choice for coarser mesh from the starting position 302. A thicker wire is not necessitated by requesting a coarser (lower count) mesh, but the thicker 0.041" diameter wire represents the only product configuration the seller chooses to produce and sell. A thicker navigation-direction 312 points to a no-link position 314. Such occurs when there is no available product choice in that direction. A thinner navigation-direction 316 takes the user to a hot-dipped galvanized 4-mesh with 0.025" diameter wire in a position 318. Such represents the next choice for thinner-wire mesh from the starting position 302. The mesh count remains at 4-mesh.

The dataflow 300 in FIG. 3 can be used by a web designer in implementing embodiments of the webserver 102 (FIG. 1). A more detailed implementation would be assisted by creating webpage fill-in forms like those illustrated in FIGS. 4–7. A commercially marketed computer program sold by FileMaker, Inc., called FILEMAKER-PRO, provided good results for such forms.

Figure 4:
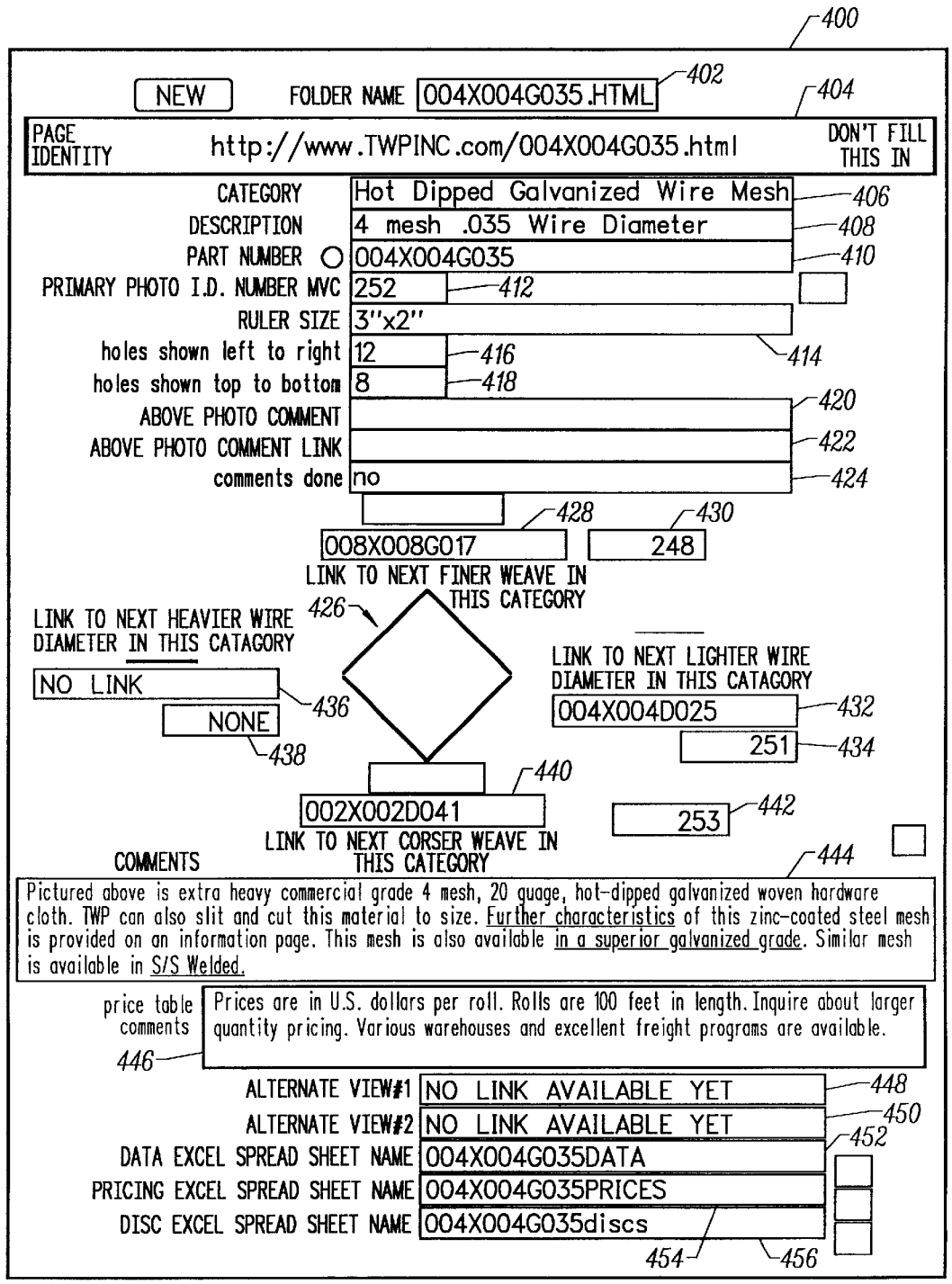
FIG. 4 is a diagram that represents a design form for a HTML product page, e.g., for a "004X004G035" wire-mesh product, and such is used by a webpage designer as a tool for HTML coding.

FIG. 4 diagrams a form 400 that corresponds to the implementation of position 302 (FIG. 3). A folder name 402 is filled-in with "004X004G035.HTML", e.g., the hypertext mark-up language (HTML) for 4×4 mesh galvanized 0.035" diameter. A URL 404 designates where the HTML file will be found on the Internet, e.g., "http://www.TWPINC.com/004X004G035.html". This is read, using hypertext transfer protocol, within the word wide web, at TWPINC.com, file 004X004G035.html. In actuality, a domain name server (DNS) coverts the "TWPINC.com" part to a four-place Internet protocol (IP) address in the form "00.00.00.00". A category box 406 allows for a common grouping, e.g., "Hot Dipped Galvanized Wire Mesh". A description box 408 is used to enter the common product name, e.g., "4-Mesh 0.035 Wire Diameter". A part number box 410 provides information necessary to order this product, e.g., "004X004G035". A photo-ID box 412 identifies which GIF or JPG picture file relates to this particular product, e.g., "252". Such information is used to control what appears in product picture 224 (FIG. 2). A ruler-size box 414 is filled in with information that corresponds to the scale used in the picture file recited in photo-ID box 412. For example, "3 by 2 inches". A horizontal dimension box 416 is filled-in with the number of holes, left-to-right, represented in the product picture. A vertical dimension box 418 is filled-in with the number of holes, top-to-bottom, represented in the product picture. A photo-comment box 420 provides for comments about the product picture. A photo-comment link box 422 provides for a file or URL link to information about the product picture. A comments-done? box 424 allows work-in-progress to be marked.

A four-way navigation symbol 426 signals the four directions a user can navigate, and corresponds to navigation window 202, especially buttons 210–213 (FIG. 2). A next-finer weave box 428 indicates a product description, file, or URL to be taken, e.g., "008X008G017". A next-link photo box 430 corresponds to the item in the next-finer weave box 428. A next-lighter-wire box 432 indicates a product description, file, or URL to be taken, e.g., "004X004D025". A next-link photo box 434 corresponds to the item in the next-lighter-wire box 432. A next-heavier-wire box 436 indicates a product description, file, or URL to be taken, e.g., "no-link". See, position 324 (FIG. 3). A next-link photo box 438 corresponds to the item in the next-heavier-wire box 436. A next-coarser weave box 440 indicates a product description, file, or URL to be taken, e.g., "002X002D041". A next-link photo box 442 corresponds to the item in the next-coarser weave box 440. A comments box 444 includes remarks that the webpage designer wants to appear in the comments field 208 (FIG. 2). Similarly, a price-table comments box 446 includes remarks that the webpage designer wants to appear when prices are quoted. An alternate view-1 box 448 is used for alternative product photos that will be displayed as picture 224 in response to clicking on button 226 (FIG. 2). An alternate view-2 box 450 is used for alternative product photos that will be displayed as picture 224 in response to clicking on button 228 (FIG. 2). An Excel spreadsheet name box 452 is used to link to a corresponding data file. A pricing Excel spreadsheet name box 454 is used to link to a corresponding prices file, e.g., as would be invoked in response to clicking button 230 (FIG. 2). A disc Excel spreadsheet name box 456 is included.

Figure 5:
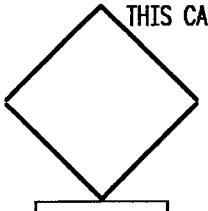
FIG. 5 is a diagram that represents a design form for a HTML product page, e.g., for a "008X008G017" wire-mesh product, and such is used as a tool for HTML coding.

FIG. 5 diagrams a form 500 that corresponds to the implementation of position 306 (FIG. 3). A folder name 502 is filled-in with "008X008G017.HTML", e.g., the hypertext mark-up language (HTML) file for 8×8 mesh galvanized 0.017" diameter. A URL 504 designates where the HTML file will be found on the Internet, e.g., "http://www.TWPINC.com/008X008G017.html". The rest of the form 500 is similar to that represented in FIG. 4.

Figure 6:
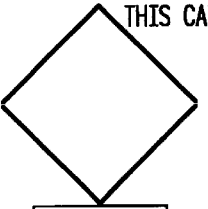
FIG. 6 is a diagram that represents a design form for a HTML product page, e.g., for a "002X002D041" wire-mesh product, and such is used as a tool for HTML coding.

FIG. 6 diagrams a form 600 that corresponds to the implementation of position 310 (FIG. 3). A folder name 602 is filled-in with "002X002G041.HTML", e.g., the hypertext mark-up language (HTML) file for 2×2 mesh galvanized 0.041" diameter. A URL 504 designates where the HTML file will be found on the Internet, e.g., "http://www.TWPINC.com/002X002G041.html". The rest of the form 600 is similar to that represented in FIG. 4.

Figure 7:
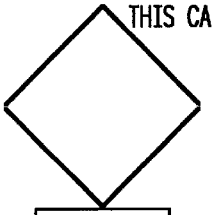
FIG. 7 is a diagram that represents a design form for a HTML product page, e.g., for a "004X004D025" wire-mesh product, and such is used as a tool for HTML coding.

FIG. 7 diagrams a form 700 that corresponds to the implementation of position 318 (FIG. 3). A folder name 702 is filled-in with "004X004D025.HTML", e.g., the hypertext mark-up language (HTML) file for 4×4 mesh galvanized 0.025" diameter. A URL 504 designates where the HTML file will be found on the Internet, e.g., "http://www.TWPINC.com/004X004D025.html". The rest of the form 700 is similar to that represented in FIG. 4.

Figure 8:
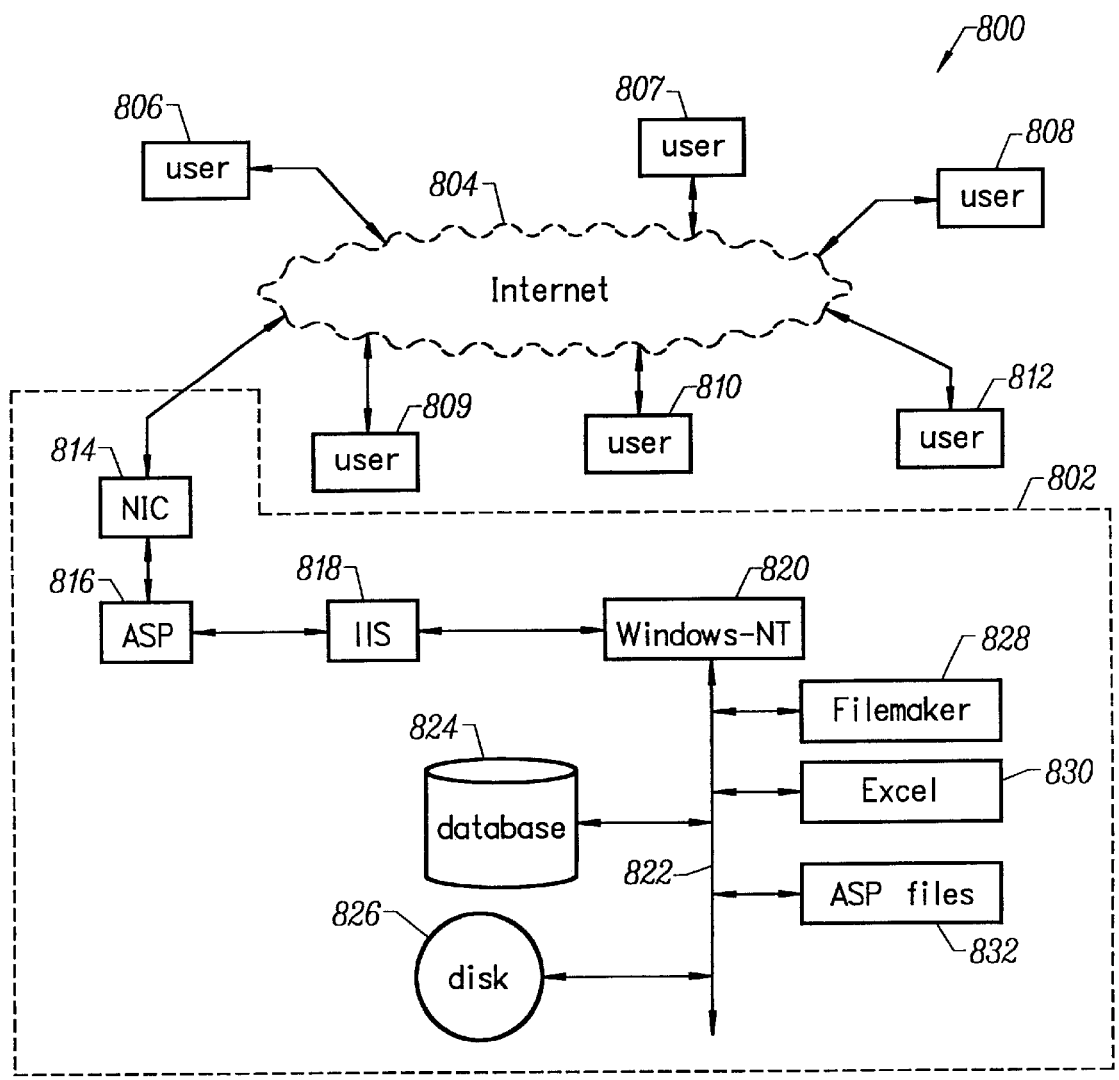
FIG. 8 is a functional block diagram of an Internet wire-mesh disc merchandizing system embodiment of the present invention.

FIG. 8 represents an Internet system 800 that allows a customer to price, design, and visually display filter discs. Such customer is saved the delays and mistakes made in traditional request-answer, request-quote, and order cycles. Each quotation requires a computation by the seller for materials and labor. A computer is used to compute these and allows the user to adjust the labor price for all, e.g., forty-million, possibilities by changing a single input variable. The system 800 accounts for any changing raw materials price by automatically generating a bill-of-materials and requesting a current price from an internal inventory and/or outside mesh-bulk suppliers, weavers, mills, and warehouses.

The system 800 comprises a webserver 802 connected to the Internet 804 and many clients or shoppers 806–812. The webserver 802 interfaces to the Internet 804 with a network interface controller (NIC) 814. An interactive webpage user interface 816 provides functionality similar to Microsoft Corporation (Redmond, Wash.) Active Server Pages (ASP). An Internet file and application server 818, such as Microsoft Internet Information Server (IIS), runs under control of an operating system 820, e.g., Microsoft Windows-NT server. The ASP 816 and IIS 818 together generate a web presence on the Internet. An expansion bus 822 supports a database 824 and a general purpose storage disk 826. Various Microsoft Windows-NT services can run without requiring a user to be logged on to the system, e.g., Microsoft SQL Server, Microsoft Exchange Server, Dynamic Host Interface Protocol (DHCP), and even Windows Internet Name Service (WINS) servers. These are preferably stored in disk 826. A FILEMAKER program 828 represents a way to generate the tables needed in an HTML-coded response to a customer. An EXCEL program 830 represents one way to implement a pricing algorithm that can calculate all the variables in a single disc design or selection, and automatically populate the FILEMAKER tables with corresponding bid prices. An ASP files 832 represents a collection of routines and scripts that generate the graphical user interfaces and any JavaScript code for the users' browsers.

Figure 9:
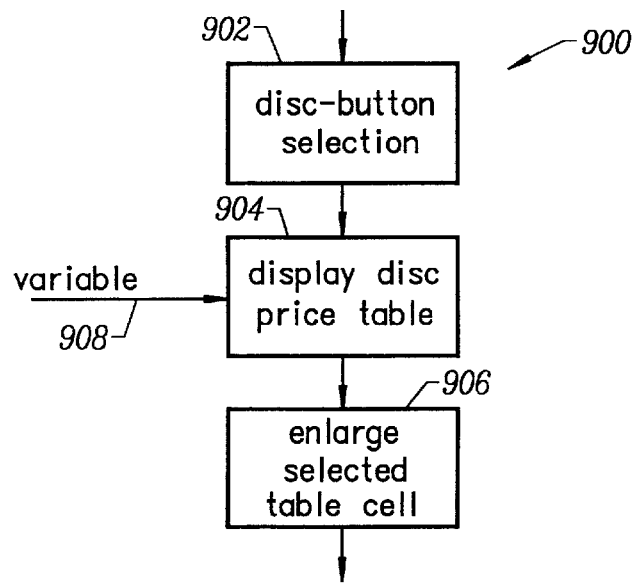
FIG. 9 is a flow chart diagram of a method embodiment of the present invention.

FIG. 9 represents method 900 that allows a customer to price, design, and visually display his own filter discs while on-line on the Internet. For example, using system 800. A "disc" navigation button on a home page embodiment of the present invention is preferably set in a step 902 to link to a plurality of price tables for various metal and plastic mesh discs. Such price tables list various quantities of cut mesh in a step 904. For example, an Excel spreadsheet with two-thousand cells in an x-y matrix could be linked to. Each cell has a photograph and a quantity/price table that are enlarged in a step 906. The home page is an Internet presence support by a webserver or other host computer platform.

A single input variable 908 universally controls the prices generated in step 904. This allows the entire disc-product line's pricing to follow market, labor, and cost-of-goods variations without imposing a huge burden on the seller. A pricing formula is the used to generate the individual prices for all the particular disc varieties available. Such formula is preferably implemented as an algorithm with a host computer platform.

Figure 10:
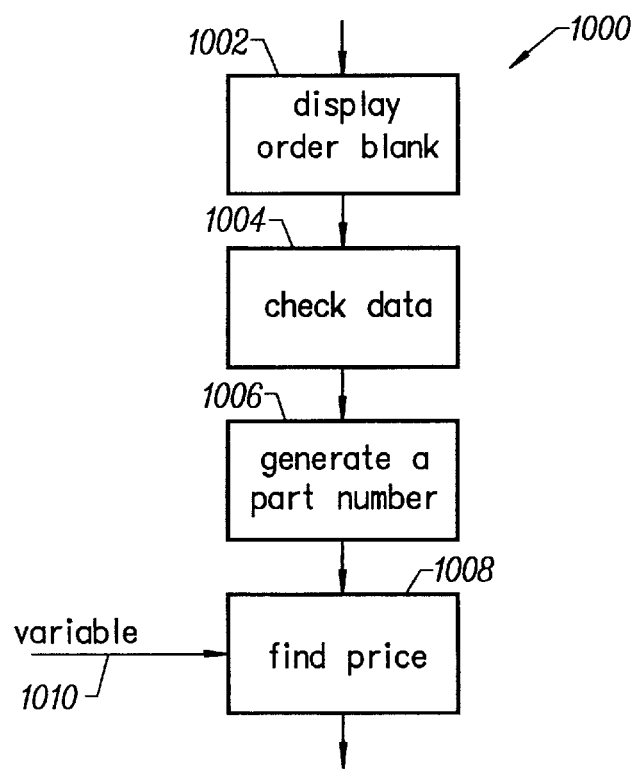
FIG. 10 is a flow chart diagram of an alternative method embodiment of the present invention.

FIG. 10 also represents an alternative method 1000 that allows a customer to price, design, and visually display his own plastic-mesh and wire-mesh filter discs while on-line on the Internet. An on-line customer fills-in the desired mesh, metal, disc diameter, and quantity in a blank order form in a step 1002. In actuality, such order form results in the customer's browser by sending HTML code from the webserver. The customer data entered is then checked for validity in a step 1004. A part number for this particular combination is then automatically generated, if not already pre-existing, in a step 1006. A host computer system looks up a pre-calculated table or computes a price for the stated disc requirement in a step 1008. Alternatively, this computational job can be done at the client website by downloaded JavaScript or other virtual machine.

A single input variable 1010 universally controls the prices generated in step 1008. As in method 900 (FIG. 9), this allows the entire disc-product line's pricing to follow market, labor, and cost-of-goods variations without imposing a huge burden on the seller. A pricing formula is the used within step 1008 to generate the individual prices for all the particular disc-product varieties available, and is implemented as a software program on a host computer platform.

In one exemplary embodiment of the present invention, the disc part numbers all begin with "D". The D is followed by three digits representing the size in decimal inches, and by nine more digits to indicate the x-y mesh count. Another letter indicates the material type. The diameter of the wire in the mesh is represented also in decimal parts of an inch, and this is followed by a third letter that indicates special properties, e.g. high precision, extreme flatness.

Figure 11:
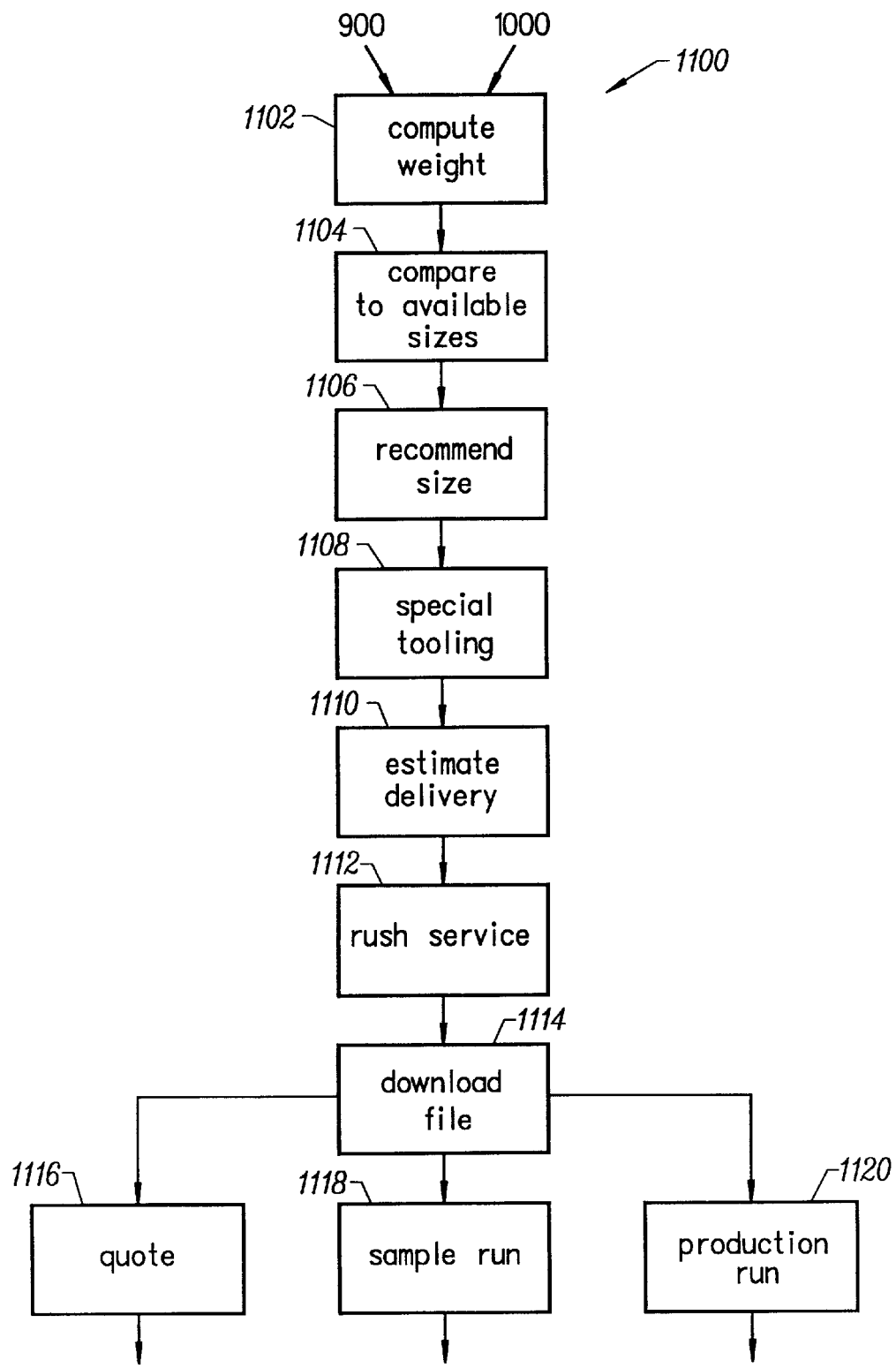
FIG. 11 is a flow chart diagram of a method embodiment of the present invention that continues either method of FIGS. 9 and 10.

FIG. 11 represents a method 1100 that continues the start made by either of methods 900 and 1000. The host computer system computes the weight in a step 1102, and compares the chosen size to a list of available sizes in a step 1104. If it's a special size, a nearest standard size is recommended in a step 1106. Otherwise, a cost to make the necessary tooling is added in a step 1108. The time needed for delivery is estimated in a step 1110. If this is not quick enough, rush service can be requested at extra charge in a step 1112. A downloadable PDF-file is made available in a step 1114 that includes a mechanical drawing of the disc, the customer's part number, the supplier's part number, and prices. For example, the FILEMAKER software product From FileMaker, Inc., has been used successfully to automatically generate such drawings. Other useful download program formats include well-known AutoCAD. Customers can also get a PDF or an e-mail for fax of the quotation in a step 1116 for the goods specified. A sample run 1118 or a production run 1120 could be ordered.

Preferably, the customer can view and print out various calculations about the screen, including flow data and weight per piece. Some discs may be impractical to produce because they have too few wires and tend to skew easily. Other discs might be more economical specified with a different mesh. In alternative embodiments of the present invention, the customer indicates the type of environment the discs would operate in, so a recommended list of materials in their order of suitability could be generated.

Embodiments of the present invention may also be used to specify what size disc would be an interference fit within given cavity, e.g., a quarter-inch NPT pipe thread. A useful variation in steps 904, 1008, and 1114 would also give normal tolerance prices, and also tight-tolerance disc prices.

Although the invention is preferably described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A plastic-mesh and wire-mesh disc selection Internet website system, comprising:

a user interface that allows a customer to price, design, and visually display plastic-mesh and wire-mesh filter discs;

a computer for providing a price by the seller for materials and labor related to said plastic-mesh and wire-mesh filter discs and for indicating the implausibility of cutting said plastic-mesh and wire-mesh filter discs;

a program hosted on said computer for generating tables needed in an HTML-coded response to the customer;

a pricing algorithm hosted on said computer for calculating variables of disc designs and automatically populating said tables with corresponding prices by using said calculated variables, wherein said tables list a plurality of various quantities of said plastic-mesh and wire-mesh filter discs;

means for collecting desired mesh, metal, disc diameter, and quantity data from the customer, means for checking said collected data and any combination of said collected data for validity and implausibility;

means for automatically generating a part number for a particular combination specified by the customer;

means for determining a corresponding price for a quantity of filter discs identified by said part number, said part number price; and means for the customer viewing and printing out results, said results comprising said price.

2. The system of claim 1, further comprising:

means for controlling all disc prices included in said quantity/price tables with a single input variable, wherein pricing is enabled to follow market, labor, and cost-of-goods variations.

3. The system of claim 1, further comprising:

means for computing a disc filter weight for a combination of mesh, metal, disc diameter, and quantity specified on-line.

4. The system of claim 3, further comprising:

means for comparing said specified combination to a list of available sizes.

5. The system of claim 4, further comprising:

capability of recommending a nearest standard size filter disc; and capability of computing a cost to make the necessary tooling for a special size filter disc.

6. The system of claim 5, further comprising:

means for estimating delivery time for said filter discs by transmitting information from a webserver to a browser of the customer.

7. The system of claim 6, further comprising:

means for offering rush service at an extra charge.

8. The system of claim 6, further comprising:

means for downloading a file that includes a mechanical drawing of a disc, a customer's part number, a supplier's part number, and any associated prices.

9. The system of claim 6, further comprising:

means for sending a customer at least one of a PDF-file, an e-mail, and fax that includes a quotation for specified filter discs.

10. The system of claim 6, further comprising:

means for displaying to a customer a calculation used in a price estimate provided for a filter disc.

11. The system of claim 6, further comprising:

means for validity checking for filter discs that are impractical to produce because they have too few wires and tend to skew easily.

12. The system of claim 6, further comprising:

means for validity checking for filter discs that are more expensive to produce than available alternatives.

13. The system of claim 6, further comprising:

means for asking a customer to indicate the type of environment filter discs are to operate in; and means for recommending a list of materials in an order of suitability for such application.

14. The system of claim 6, further comprising:

means for asking a customer to indicate a cavity size a filter disc must operate within; and means for recommending a particular sized filter disc that has an interference fit within said given cavity.

15. The system of claim 6, further comprising:

means for quoting both normal tolerance filter disc prices, and tight-tolerance filter disc prices.

16. A plastic-mesh and wire-mesh disc selection Internet website method, comprising the steps of:

providing a user interface that allows a customer to price, design, and visually display plastic-mesh and wire-mesh filter discs;

providing a computer for providing a price by the seller for materials and labor related to said plastic-mesh and wire-mesh filter discs and for indicating the implausibility of cutting said plastic-mesh and wire-mesh filter discs;

providing a program hosted on said computer for generating tables needed in an HTML-coded response to the customer;

providing a pricing algorithm hosted on said computer for calculating variables of disc designs and automatically populating said tables with corresponding prices by using said calculated variables, wherein said tables list a plurality of various quantities of said plastic-mesh and wire-mesh filter discs;

collecting desired mesh, metal, disc diameter, and quantity data from the customer, checking said collected data and any combination of said collected data for validity and implausibility;

automatically generating a part number for a particular combination specified by the customer;

said computer determining a corresponding price for a quantity of filter discs identified by said part number, said determining comprising looking up a pre-calculated table and computing a price; and displaying and printing out results, said results comprising said price.

* * * * *